F. MÜNZ.
OPERATING MECHANISM FOR DOUGH KNEADING MACHINES.
APPLICATION FILED SEPT. 2, 1913.
1,081,858.  Patented Dec. 16, 1913.
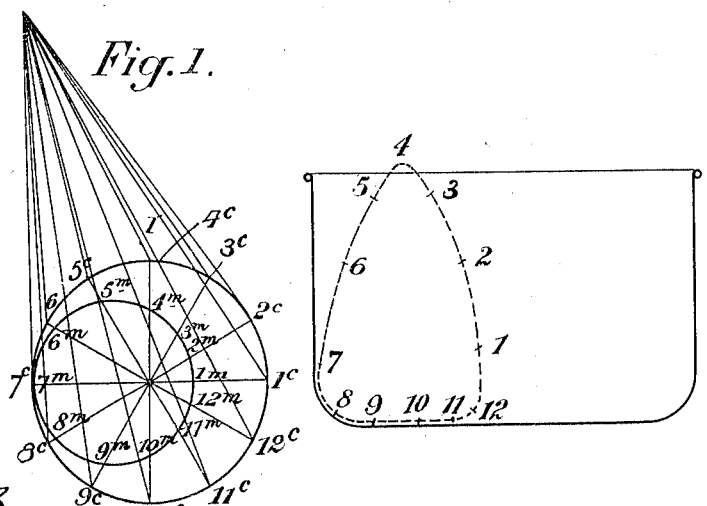
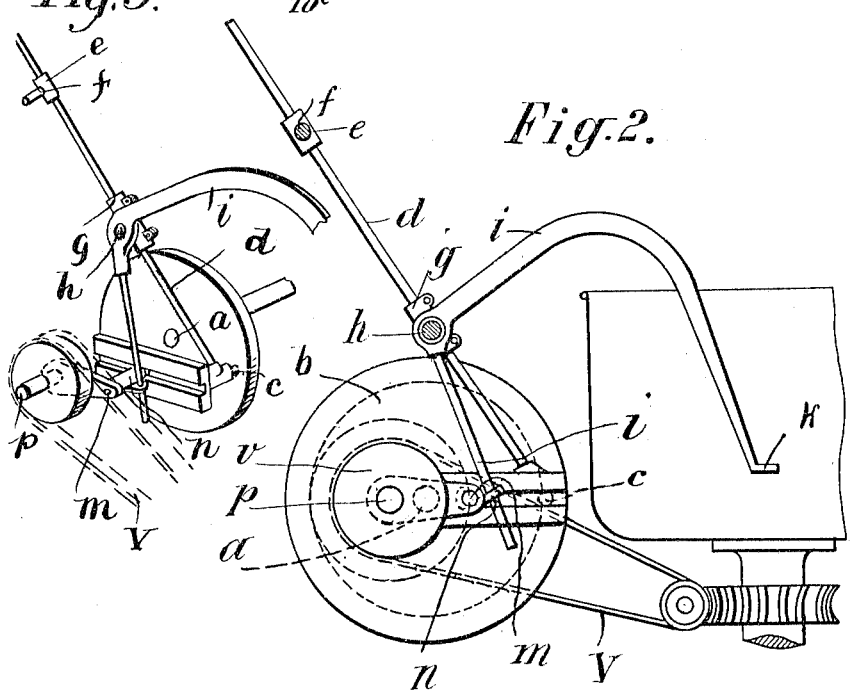
Witnesses:  Inventor:
F. M. Meyer  Friedrich Münz
E. E. Johansen  By ____ Attorney.

UNITED STATES PATENT OFFICE.

FRIEDRICH MÜNZ, OF STUTTGART, GERMANY.

OPERATING MECHANISM FOR DOUGH-KNEADING MACHINES.

1,081,858.  Specification of Letters Patent.  Patented Dec. 16, 1913.

Application filed September 2, 1913. Serial No. 787,717.

*To all whom it may concern:*

Be it known that I, FRIEDRICH MÜNZ, a subject of the German Emperor, and resident of Stuttgart, Germany, have invented certain new and useful Improvements in Operating Mechanism for Dough-Kneading Machines, of which the following is a specification.

The present invention relates to operating mechanism for dough kneading machines having a rotary trough.

The object of the present invention is to provide means for imparting irregular speed to the kneading trough with reference to the speed of the kneading bar, the speed of both the trough and the bar being timed to produce as near as possible the kneading movement usually produced when kneading dough by hand.

The invention also comprehends improvements in the details of construction and arrangement of parts which will be hereinafter described and pointed out in the claims.

In the accompanying drawing: Figure 1 is a diagrammatic view illustrating the movement of the kneading trough and kneading bar. Fig. 2 is a side view of the operating mechanism. Fig. 3 is a detail perspective view of the operating mechanism.

In a suitable support is mounted a shaft $a$, on which is mounted a driving wheel $b$, provided with a crank pin $c$ which carries at its end an integral arm $q'$ formed with a slot $q$. On the crank pin $c$, is mounted a rod $d$, which is guided in a sleeve $f$ pivotally mounted on a pin $e$. Adjustably supported on rod $d$ is a block $g$, from which extends a stud $h$, and on the latter is mounted a kneading bar $i$. The kneading bar $i$ extends forwardly from the stud $h$, and thence is bent downwardly, and at its lower end it is provided with a kneading finger $k$. From the stud $h$, the opposite end of the kneading bar extends downwardly and passes through a sleeve $n$, freely mounted on a crank pin $m$, extending from a crank $o$, mounted on a shaft $p$. The axis of the crank pin $m$ is not the same as the axis of rotation of the crank pin $c$, as will be seen by referring to the drawing. The crank pin $m$, fits in and slides in the slot $q$ in the arm $q'$, whereby power transmitted to shaft $a$, will cause the shaft $p$ to rotate also. By this construction the movement of the pins $m$ and $p$ vary, for a purpose to be described.

Mounted on the shaft $p$, is a pulley $r$, and passing around same and a pulley on a worm shaft is a belt, to impart motion to a worm $s$, which engages a worm wheel $t$, secured on a central shaft, which supports a kneading trough $u$.

In operation, when the pulley $b$, is rotated, it imparts motion through the crank $o$, and pin $m$, to shaft $p$, and as the latter is rotated, it will through the gearing rotate the kneading trough. In the rotation of the pulley $b$, the bar $d$, is swung and at the same time reciprocated, and as the kneading bar $i$ is pivoted on bar $d$, and its end is operated by the sleeve $n$, the finger $k$, is caused to travel approximately in a pyramidal path in the kneading trough as indicated in Fig. 1. Because of the connections described, the speed of the kneading trough varies. The diagram, Fig. 1, illustrates the path of movement of the finger $k$, in the trough, and also the path of movement of the crank pins $m$ and $c$. The path traveled by the finger $k$, is divided into twelve parts 1, 2, 3, 4, 5, 6, 7, 8, 9, 10, 11, and 12; the path traveled by the pin $c$, is divided into twelve parts $1^c$, $2^c$, $3^c$, $4^c$, $5^c$, $6^c$, $7^c$, $8^c$, $9^c$, $10^c$, $11^c$, and $12^c$, while the path traveled by the pin $m$ is divided into twelve parts $1^m$, $2^m$, $3^m$, $4^m$, $5^m$, $6^m$, $7^m$, $8^m$, $9^m$, $10^m$, $11^m$, and $12^m$.

Considering points 1—$1^c$ and $1^m$ as zero, and supposing the wheel $b$ is rotating in the direction of the arrow, Fig. 1, it will be obvious that because of the eccentric arrangement of the crank pins, the distance between $1^m$ and $10^m$ is less than the distance between $1^c$ and $10^c$, hence the speed of the pulley $r$, is reduced, and therefore the speed of the trough is also reduced. At this time the finger $k$ is moving downwardly between the points 4 to 10, near the center of the mass of dough. From point 10 the finger commences to move horizontally and then upwardly near the outer edge of the mass of dough, or until the point 4 is reached. During the latter movement, pin $c$, travels from point $10^c$, to $7^c$, and pin $m$, travels from point $10^m$ to $7^m$, the speed of pin $m$ increasing from point $10^m$ to $7^m$, hence increasing the speed of the trough. As the pins $c$ and $m$ are approaching each other toward points $7^c$—$7^m$, the speed of the trough and finger is the same when said points are reached.

From point 12 the finger $k$, commences to travel toward the outer side of the mass until point 8 is reached, and then it commences to ascend toward point 4.

What I claim is:—

1. In combination, a kneading trough, a reciprocating kneading bar operating in said trough, and means for rotating the trough and operating the bar, said means including mechanism for varying the rotary speed of the trough, the maximum speed of the trough occurring when the kneading bar is ascending.

2. In combination, a kneading trough, a pivotally mounted kneading bar including a finger and stem, a reciprocating rod to which the kneading bar is pivoted, a pulley, a crank pin extending from the pulley and on which the rod is mounted, a shaft mounted eccentrically to the pulley, a crank on said shaft, a sleeve pivoted to the crank, the stem operating in the sleeve, means between the pulley and the crank to cause simultaneous rotation of the pulley and crank, gearing for rotating the trough, and means between the shaft and gearing for operating the trough, the crank causing the speed of the trough to vary.

3. In combination, a kneading trough, a kneading bar, means for simultaneously rotating the trough at a varying speed and imparting an irregular movement to the kneading bar in the trough, said means including two shafts, an eccentrically mounted crank pin upon each shaft, said crank pins operating the kneading bar and one of said crank pins serving to transmit varying speed to said trough.

In testimony whereof I have hereunto set my hand in presence of two witnesses.

FRIEDRICH MÜNZ.

Witnesses:
 ERNST BEZLER,
 ROSA THALBAUER.

---

Copies of this patent may be obtained for five cents each, by addressing the "Commissioner of Patents, Washington, D. C."